United States Patent

[11] 3,597,882

| [72] | Inventor | Anthony John Riddington<br>Peterborough, England |
|---|---|---|
| [21] | Appl. No. | 821,795 |
| [22] | Filed | May 5, 1969 |
| [45] | Patented | Aug. 10, 1971 |
| [73] | Assignee | The Newall Engineering Company Limited<br>Old Fielton, Peterborough,<br>Northamptonshire, England |
| [32] | Priority | May 6, 1968 |
| [33] | | Great Britain |
| [31] | | 21260/68 |

[54] HYDRAULIC BALANCING OF ROTARY MEMBERS USING MOVABLE WEIGHTS
9 Claims, 2 Drawing Figs.

[52] U.S. Cl. ................................................. 51/169, 74/573
[51] Int. Cl. ....................................................... B24b 45/00
[50] Field of Search .......................................... 51/169; 74/573, 573 F

[56] References Cited
UNITED STATES PATENTS

| 2,142,021 | 12/1938 | Ernst et al. | 51/169 |
| 2,261,568 | 11/1941 | Seawright | 74/573 |
| 2,659,243 | 11/1953 | Darrieus | 74/573 |
| 2,778,243 | 1/1957 | Darrieus | 74/573 |
| 3,371,450 | 3/1968 | Board et al. | 51/169 |

*Primary Examiner*—Lester M. Swingle
*Attorney*—Watson, Cole, Grindle & Watson

ABSTRACT: The invention concerns a balancing assembly for rotary members such as grinding wheels. Two cylinders at right angles in the plane of rotation of the wheel each contain hydraulic fluid and a slidable balance weight. Signals from a vibration pickup are used to control fluid flow to and from the ends of the cylinders to alter the positions of the weights and correct unbalance of the wheel.

HYDRAULIC BALANCING OF ROTARY MEMBERS USING MOVABLE WEIGHTS

BACKGROUND OF THE INVENTION

This invention relates to the balancing of rotary members.

There are a number of circumstances in which it is desirable to balance or correct unbalance in a rotary member. One example, for which the present invention is particularly suitable is the balancing of a grinding wheel. A grinding wheel is subject to unbalance for a number of reasons, one important reason being that its periphery is worn away to different degrees in different places. When as a result the center of gravity of the wheel becomes displaced from alignment of the axis of rotation the grinding wheel or the associated spindle and the housing are subject to vibration which debilitates the performance of the grinding wheel. It is therefore desirable to correct the unbalance caused by this or any other phenomenon. Additionally, the grinding wheel or in general the rotary member may be asymmetrical and it is often desired to ensure that the effects of the asymmetry on the rotation of the member are reduced. For this purpose, it is the practice to provide at least one and preferably two balance weights which is, or each of which is, movable in a direction having a radial component with respect to the aforementioned axis of rotation. In the case of two balance weights, they are normally arranged so that they can be moved in two perpendicular directions both in the plane of rotation of the rotary member. The balance weights are moved either manually or automatically in their respective directions so that the total moment of the weights about the axis of rotation compensates for the unbalance that would otherwise be present and which normally is represented by a displacement of the center of gravity of the rotary member from the axis of rotation. Since this displacement can be regarded as having a component in each of two perpendicular directions in the plane of rotation the balance weights are normally movable in or parallel to those two directions. In some circumstances however it is possible to use one balance weight only.

Hitherto, balancing mechanisms whether provided as an attachment to the rotary member or as a permanent part thereof have included motors and mechanical links for effecting movement of the balance weights. These motors and linkages are rotated with the rotary member, which increases the inertia thereof (which may be undesirable) as well as being a possible further source of unbalance.

It is the object of the present invention to provide an improved balancing mechanism for a rotary member.

SUMMARY OF THE INVENTION

In the present invention at least one hydraulic cylinder containing a balance weight is arranged or adapted for rotation with the rotary member and is arranged so that by altering the volumes of hydraulic fluid in the cylinder on each side of the weight the weight is moved along the cylinder, the distance of the weight from the axis of rotation of the rotary member is altered.

With the present invention, the correction of unbalance may be simply effected by controlling the flow of hydraulic fluid to and from the cylinder. One particular advantage of this arrangement is that it is relatively simple to ensure, by for example providing appropriate flow valves, that the balance weight does not move along the cylinder under the influence of centrifugal force.

Conveniently the cylinder is straight and is disposed in the plane of rotation of the rotatable member.

As indicated above, it is usual to provide two balance weights and for this purpose there may be provided two hydraulic cylinders of the kind aforesaid each having a balance weight as aforesaid disposed therein, the two cylinders being disposed at right angles. Conveniently the weight or each weight is movable to equal extents on either side of the axis of rotation of the rotary member.

The present invention may be either manual, semiautomatic or completely automatic. In the case of manual operation, the means for altering the fluid volumes can be controlled by a pushbutton arrangement and balance achieved by trial and error. For semiautomatic or automatic operation it would be usual to employ a vibration pickup which in accord with usual practice provides signals corresponding to the amount and radial position of the existing unbalance. The signals may be resolved in two directions corresponding to those for which the movement of the balance weights can provide correction of unbalance and means responsive to the resolved signals may be provided to actuate flow control means so as to move the weight or weights to reduce the unbalance. It is relatively simple with the present invention to provide flow of hydraulic fluid to and from the cylinders by means of a hydraulic rotatable joint.

DESCRIPTION OF THE PREFERRED EMBODIMENTS

Figure 1:
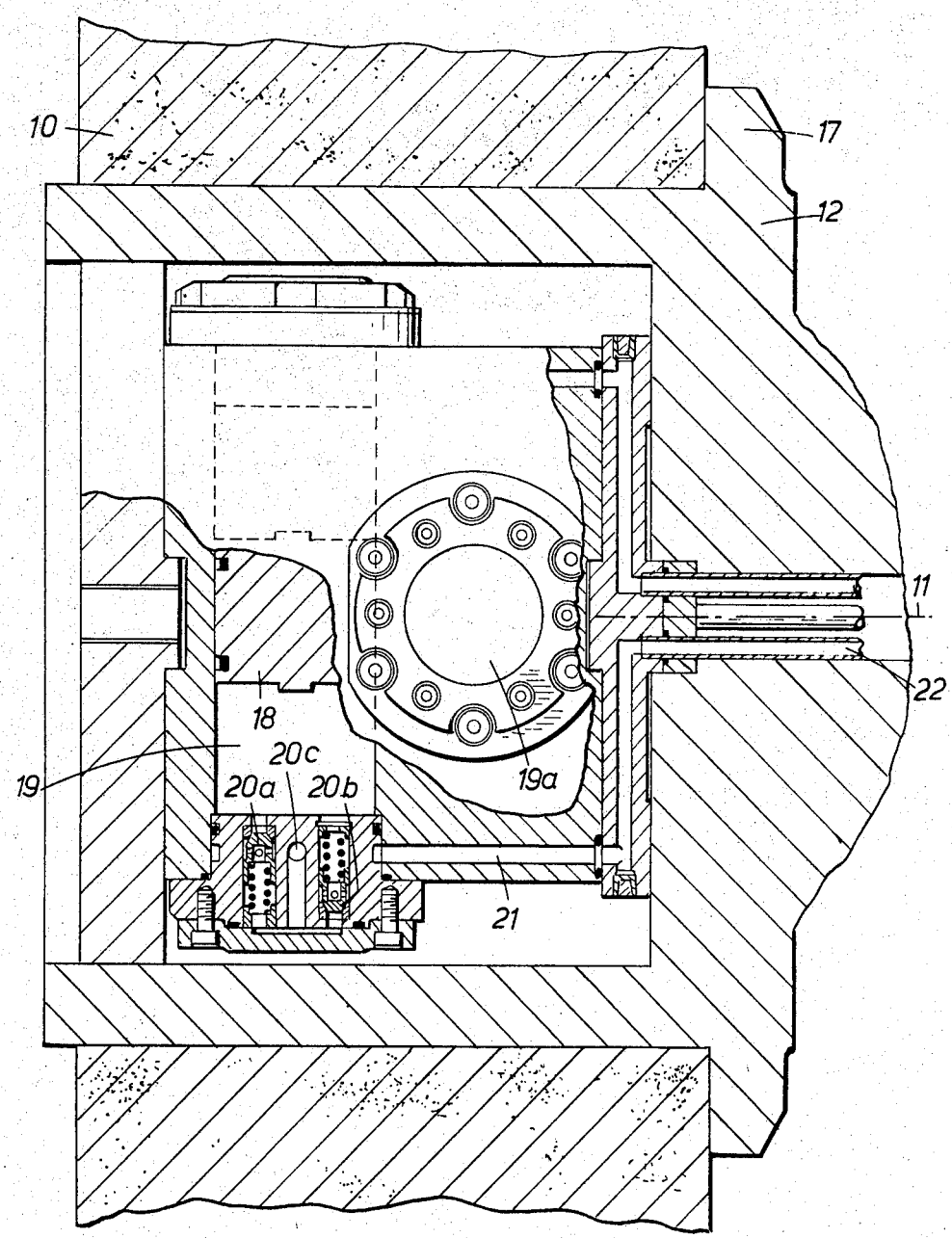
FIG. 1 illustrates a sectional view of a balancing mechanism constructed in accord with the invention and applied to the correction of imbalance of a grinding wheel.
Figure 2:
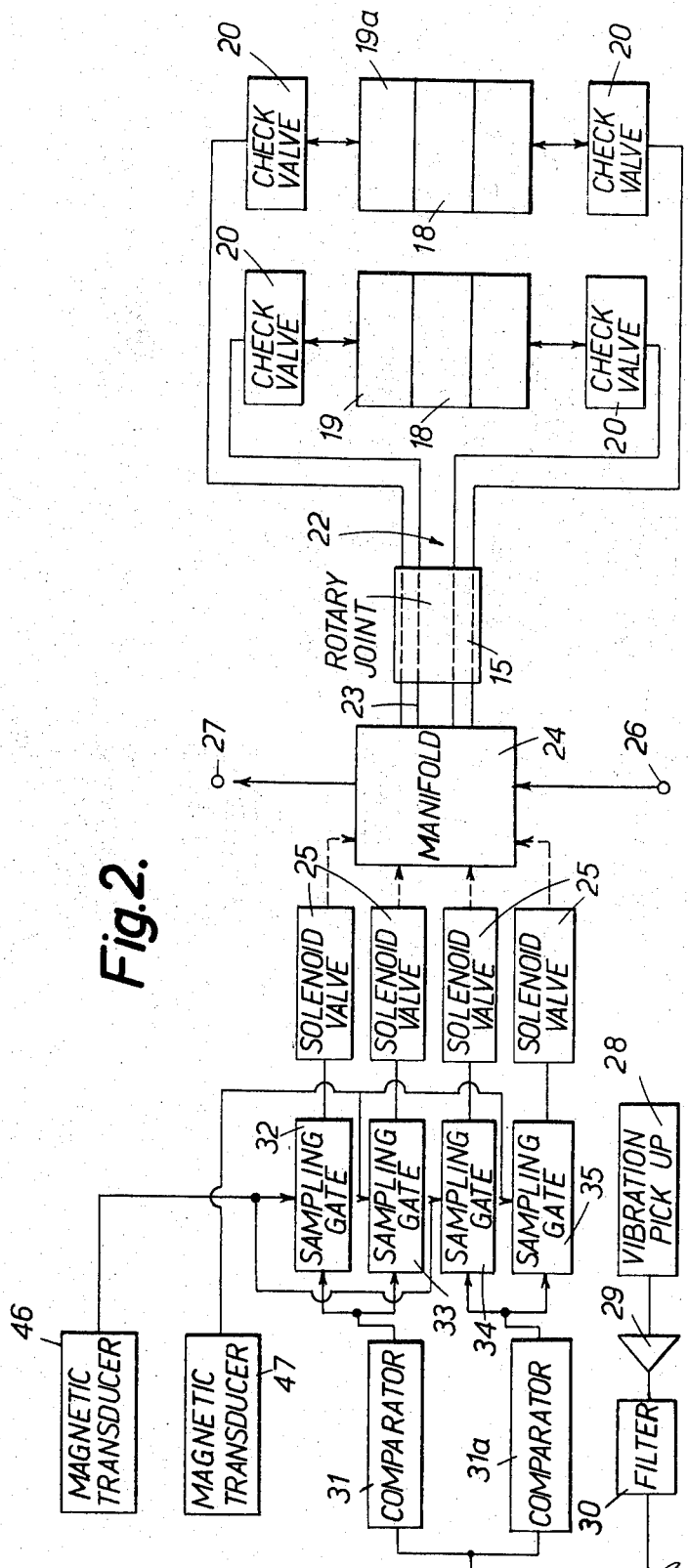
FIG. 2 is a schematic diagram illustrating the various control devices associated with the apparatus of FIG. 1.

In FIG. 1 there is shown the inner part of a grinding wheel 10 mounted on a spindle 12 whose axis is shown by a line 11. The spindle 12 is rotatable in a wheel head (not shown) and is supported by a spindle bearing (not shown). The spindle carries an inner end flange 17 which supports the grinding wheel 10 by any suitable means and also provides a housing for the balancing mechanism to be described. Within the flange are provided two cylinders 19 and 19a which are disposed in the plane of rotation of the grinding wheel and which extend mutually at right angles. Both cylinders are straight and each have within them a balance weight 18 (only one of which is shown in FIG. 1). Hydraulic fluid is supplied to and taken from each end of each cylinder by means of a check valve 20. Only the check valve for the lower end of cylinder 19 is shown in detail. It includes two spring-biased needle valves 20a and 20b each openable to couple hydraulic pressure to and from the cylinder 19 from and to a common port 20c which leads via a bore 21 to a pipe 22 along the spindle axis. Each check valve arrangement couples a respective end of a cylinder 19 to a respective one of four pipes 22 which lead (as shown in FIG. 2) via a conventional rotary joint 15 to corresponding pipes 23 leading to a manifold 24. Four solenoid valves 25 provide selective coupling of the pipes 23 to a hydraulic source 26 and a drain port 27.

By varying the position of the weights within the cylinders the moments of the weights about the axis of rotation 11 may be altered so as to bring the center of gravity at the rotating parts into alignment with the axis of rotation 11.

The control of the movement of the balance weights can be manual, it being possible to provide appropriate valves which are connected to pressure sources, and are operated by push buttons. More conveniently however it is desirable to provide at least partial automatic operation of the device. By fully automatic is meant that the balancing mechanism would be continuously operative to correct unbalance. By partially automatic is meant the balancing mechanism would not function to correct unbalance unless its operation were initiated by an operator, its operation being thereafter automatic. In either event, the system illustrated in FIG. 2 may be employed.

Referring now particularly to FIG. 2, there is shown diagrammatically the cylinders 19, 19a containing the balance weights 18 sealingly slidable therealong. The volumes of fluid in contact with the cylinders at either side of the balance weights are maintained by the four check valves 20. Each check valve provides flow only when the inlet pressure thereto is greater than a predetermined value. It would of course be usual to ensure that the predetermined value were higher than any pressure developed as a result of centrifugal force acting on the weights.

For developing the necessary signals indicating the amount and radial position of an existing unbalance there may be provided a conventional vibration pickup 28 which has its axis at right angles to the axis 11 and which supplies an electrical signal proportional to the vibration occurring either in the spindle or the housing. Such a vibration pickup may take any of the commonly employed forms. The pickup's output is amplified by an amplifier 29 and filtered by a filter 30 which removes from the aforementioned electrical signal those components that are not at or harmonically related to the operating speed of the spindle.

The filtered signal is fed to two comparators 31, 31a which pass, respectively, those parts of the vibration waveform above and below a zero datum. The "positive" output from the comparator 31 is fed to sampling gates 32 and 33 whereas the negative output from the comparator 31a is fed to sampling gates 34 and 35. Each sampling gate is associated with a respective solenoid valve 25: thus when the vibration waveform is sampled, a maximum of two solenoid valves, one for each cylinder, is opened, and the weights moved a fixed increment in the sense required to correct the unbalance. Two magnetic transducers 46 and 47 are provided to provide gate-opening signals for the gates 32, 34 and 33, 35 respectively when the axis of the cylinder is parallel to and across the axis of the vibration pickup. Each transducer includes a respective pulse-forming circuit controlling the appropriate gates. The actuation of each solenoid valve 25 couples, in any convenient manner, a respective one of the feed lines 23 to the pressure source 26 whereby hydraulic pressure is coupled to the respective end of the respective cylinder. At the same time the feed line 23 for the other end of the cylinder is coupled to the drain port 27. The coupling of the lines to the source and rain is momentary; at the instants of sampling of the vibration waveform the weights are moved alternately until the sampled amplitude of the vibration waveform is insufficient to cause operation of the solenoid valves.

It may if desired be possible to provide a visual indication of the quadrant in which the out of balance lies and also if the correction required is beyond the ability of the mechanism. It is possible to provide means for attaching to the rotatable member a standard weight at a known distance from the axis of rotation so as to provide an auxiliary means of correcting unbalance.

I claim:

1. In combination with a rotary member having an axis of rotation, a balancing assembly comprising at least one hydraulic cylinder which is rotatable with the rotary member and which contains hydraulic fluid, a balance weight slidably mounted in said cylinder, said weight dividing said fluid into first and second volumes at respective ends of said cylinder, and means for altering the aforementioned volumes to move the weight along the cylinder; said cylinder being oriented with respect to said rotary member whereby movement of the said weight alters its distance from said axis of rotation.

2. The combination as set forth in claim 1 in which two of said assemblies are provided, the two cylinders of said assemblies being disposed along first and second axes at right angles in a plane normal to said axis of rotation.

3. The combination set forth in claim 2 further comprising a vibration pickup operative to provide signals representative of the unbalance of the rotary member, means for resolving the said signals along said first and second axes, fluid flow control means coupled to each end of each cylinder, and means responsive to the resolved signals to actuate the fluid flow control means for altering the positions of the weights in said cylinders.

4. The combination set forth in claim 3 in which a hydraulic rotatable joint couples said fluid flow control means and the cylinders.

5. The combination set forth in claim 1 in which the cylinder is straight and is disposed in the plane of rotation of the rotary member.

6. The combination set forth in claim 5 in which the said weight is movable to equal extents on either side of the axis of rotation of the rotary member.

7. In combination with a grinding wheel rotatable in a predetermined plane of rotation and about a predetermined axis, a balancing assembly comprising a cylinder containing hydraulic fluid, a balance weight sealingly slidable along said cylinder, said cylinder being oriented in said plane of rotation and intersecting said axis, a fluid conduit coupled to each end of said cylinder, inlet and outlet valve means coupling each said fluid conduit to the respective end of said cylinder, each valve means being openable under a predetermined pressure, and fluid flow control means for supplying fluid pressure to said conduits to move said weights.

8. The combination set forth in claim 7 wherein two of said assemblies are provided, the cylinder of one assembly being at right angles to the cylinder of the other assembly.

9. The combination set forth in claim 8 wherein said assemblies are mounted within said grinding wheel.